United States Patent
Xue et al.

(10) Patent No.: US 10,686,941 B2
(45) Date of Patent: Jun. 16, 2020

(54) LINK ADJUSTMENT METHOD, SERVER, AND STORAGE MEDIUM

(71) Applicant: TENCENT TECHNOLOGY (SHENZHEN) COMPANY LTD, Shenzhen, Guangdong (CN)

(72) Inventors: Zheng Xue, Shenzhen (CN); Yu Zhou, Shenzhen (CN); Jing Lv, Shenzhen (CN); Xun Zhang, Guangdong (CN); Yanbai Zhao, Shenzhen (CN); Baojian Wang, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/370,090

(22) Filed: Mar. 29, 2019

(65) Prior Publication Data
US 2019/0230225 A1 Jul. 25, 2019

Related U.S. Application Data

(63) Continuation of application No. PCT/CN2018/071265, filed on Jan. 4, 2018.

(30) Foreign Application Priority Data

Jan. 6, 2017 (CN) .......................... 2017 1 0010148

(51) Int. Cl.
*H04W 4/00* (2018.01)
*H04M 7/00* (2006.01)
(Continued)

(52) U.S. Cl.
CPC ............ *H04M 7/0084* (2013.01); *H04L 1/00* (2013.01); *H04M 3/2236* (2013.01);
(Continued)

(58) Field of Classification Search
CPC ... H04W 72/04; H04W 76/15; H04W 72/085; H04W 72/087
See application file for complete search history.

(56) References Cited

U.S. PATENT DOCUMENTS

2007/0019618 A1   1/2007   Shaffer et al.
2017/0188410 A1*  6/2017   Yaver ................... H04W 28/08

FOREIGN PATENT DOCUMENTS

CN     101945127 A    1/2011
CN     103718532 A    4/2014
(Continued)

OTHER PUBLICATIONS

International Search Report of PCT/CN2018/071265 dated Mar. 27, 2018 [PCT/ISA/210].

*Primary Examiner* — Omoniyi Obayanju
(74) *Attorney, Agent, or Firm* — Sughrue Mion, PLLC

(57) ABSTRACT

A method and apparatus are provided. The method includes obtaining call information of first users currently in network calls in a network call system. Direct link quality and relay link quality corresponding to each first user are obtained according to the call information. Call link are configured for plural second users, where the plural second users are users whose relay link quality is higher than the corresponding direct link quality among the first users.

20 Claims, 6 Drawing Sheets

(51) Int. Cl.
*H04M 3/22* (2006.01)
*H04W 88/18* (2009.01)
*H04W 88/04* (2009.01)
*H04L 1/00* (2006.01)

(52) U.S. Cl.
CPC .......... *H04M 3/2263* (2013.01); *H04M 7/00* (2013.01); *H04M 7/0087* (2013.01); *H04W 88/04* (2013.01); *H04W 88/18* (2013.01)

(56) References Cited

FOREIGN PATENT DOCUMENTS

CN 105897478 A 8/2016
EP 2 993 861 A1 3/2016

\* cited by examiner

LINK ADJUSTMENT METHOD, SERVER, AND STORAGE MEDIUM

CROSS REFERENCE TO RELATED APPLICATION

This application is a continuation of International Application No. PCT/CN2018/071265, filed Jan. 4, 2018, which claims priority from Chinese Patent Application No. 201710010148.7, filed with the Chinese Patent Office on Jan. 6, 2017 and entitled "LINK ADJUSTMENT METHOD AND APPARATUS, AND SERVER", the disclosures of each of which are incorporated by reference herein in their entireties.

FIELD OF THE TECHNOLOGY

This application relates to the field of communications technologies, and in particular, to a link adjustment method, a server, and a storage medium.

BACKGROUND OF THE DISCLOSURE

When users perform remote communication by using a Voice and Video over Internet Protocol (VVoIP) service, videos and voices are transmitted between users in a form of data streams. The data streams need to have features of low latency and high stability.

SUMMARY

It is an aspect to provide a link adjustment method, a server, and a storage medium, to improve stability of call data streams in a network call system.

According to an aspect of one or more embodiments, there is provided a method including obtaining call information of a plurality of first users currently in network calls in a network call system; obtaining direct link quality and relay link quality corresponding to each first user of the plurality of first users according to the call information; and configuring, for a plurality of second users whose relay link quality is higher than the corresponding direct link quality among the plurality of first users, call links of the plurality of second users according to the call information.

According to other aspects of one or more embodiments, there are also provided an apparatus and computer readable medium consistent with the method.

BRIEF DESCRIPTION OF THE DRAWINGS

To describe the technical solutions in the embodiments of this application more clearly, the following briefly describes the accompanying drawings for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Figure 1A:
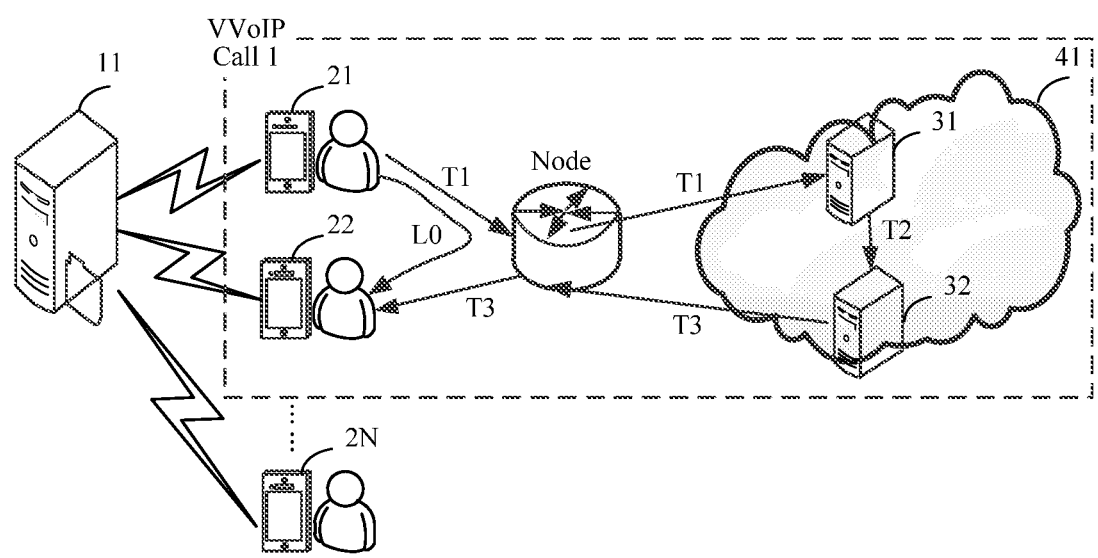
FIG. 1A is a schematic diagram of a network call system according to an embodiment of this application.

For better understanding of the technical solutions of this application, the following describes embodiments of this application with reference to the accompanying drawings.

It should be noted that the described embodiments are only some, rather than all, of the embodiments of this application. All other embodiments obtained by a person of ordinary skill in the art based on the embodiments in this application without creative efforts shall fall within the protection scope of this application.

The terms used in the embodiments of this application are merely for the purpose of illustrating specific embodiments, and are not intended to limit this application. The terms "a", "said", and "the" of the singular form used in the embodiments and the appended claims of this application are also intended to include plural forms, unless otherwise specified in the context clearly.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Depending on the context, the term "if" used herein can be interpreted as "when", "upon", "in response to determining of", or "in response to detection of". Similarly, depending on the context, the phrase "if it is determined that" or "if it is detected that (a stated condition or event)" can be interpreted as "when it is determined that", "in response to determining of", "when it is detected that (the stated condition or event)" or "in response to detection that (the stated condition or event)".

VVoIP is an Internet protocol-based communication manner for transmitting voices and images in real time between different clients. In data transmission link classes of the VVoIP, a direct link is used for direct P2P data transmission between users, and there is no dedicated server node on a transmission path; on a relay link, one or more VVoIP transit servers are added between users, and a data stream to be transmitted to a peer user needs to pass through the transit server. When data is transmitted by using a direct link, the transmission manner is simple and high transmission efficiency is achieved. However, establishment of a direct link may fail, and link stability is weak and uncontrollable. When data is transmitted by using a relay link, the link generally has good quality and high stability, and is controllable. However, server costs and bandwidth costs are increased by a certain degree, and the increase in the bandwidth costs has become a major development obstacle for many VVoIP service providers.

In the embodiments of this application, for a plurality of users whose relay link quality is higher than direct link quality, a collective decision is made according to the relay link quality and the direct link quality of each user. That is, a decision vector is determined, so that overall call quality of users in a network call system reaches an expectation.

FIG. 1A is a schematic diagram of a network call system according to an embodiment of this application. As shown in FIG. 1A, the system may include a plurality of terminal devices that use respective clients (a client 21, a client 22, . . . , and a client 2N shown in FIG. 2) to make network calls, a plurality of transit servers 31 to 3N, and a server 11 for making a link switching decision. The plurality of transit servers is connected by a private line network 41 of the network call system. In this application, a call link that performs transmission by using the private line network of the network call system is referred to as a relay link, and a call link that performs transmission without using the private line network of the network call system is referred to as a direct link.

The private line network is a network that connects all the transit servers in the network call system by using a dedicated transmission link. The dedicated transmission link is a permanent, high-speed, stable physical connection or logical connection, and has features of a low bit error rate and low latency. In some embodiments, the dedicated transmission link may include a physical transmission electrical cable or optical cable. The dedicated transmission link transmits data of the network call system only, and does not transmit data of other systems. In some embodiments, the dedicated transmission link may include a carrier (such as an optical carrier in a wavelength division multiplexing technology) of a particular frequency. The carrier transmits data of the network call system only, and does not transmit data of other systems. In some embodiments, the dedicated transmission link may include a logical communication channel, such as a tunnel or an SDH container. The logical communication channel transmits data of the network call system only, and does not transmit data of other systems. Transit servers at different geographical locations are connected by using the dedicated transmission link, so that call data transmitted by the transit servers has higher communication quality than data transmitted by using an ordinary IP connection.

In FIG. 1A, the client 21 and the client 22 are two parties of a VVoIP call 1. L0 is a direct link from the client 21 to the client 22. The client 21 may send data (including audio data and/or video data) to the client 22 through the direct link L0. Nodes on the link L0 generally refer to other network devices on the direct link, such as a router and a switch. Alternatively, the client 21 may send data to the client 22 through a relay link from the client 21 to the client 22, where the relay link is formed by a link T1, a link T2, and a link T3. On the relay link, the client 21 sends data to the transit server 31 through the link T1, the transit server 31 sends the data to the transit server 3N through the link T2, and the transit server 3N sends the data to the client 22 through the link T3. The link T2 may be a communication link between the transit server 31 and the transit server 3N in the private line network 41. Similarly, the client 22 may also send data to the client 21 through a reverse link of the link T1, the link T2, and the link T3. Data of one call of one client may be transmitted by using one of the direct link and the relay link corresponding to the client; the client may not use the other link, but can collect link quality information from the other link.

Figure 1B:
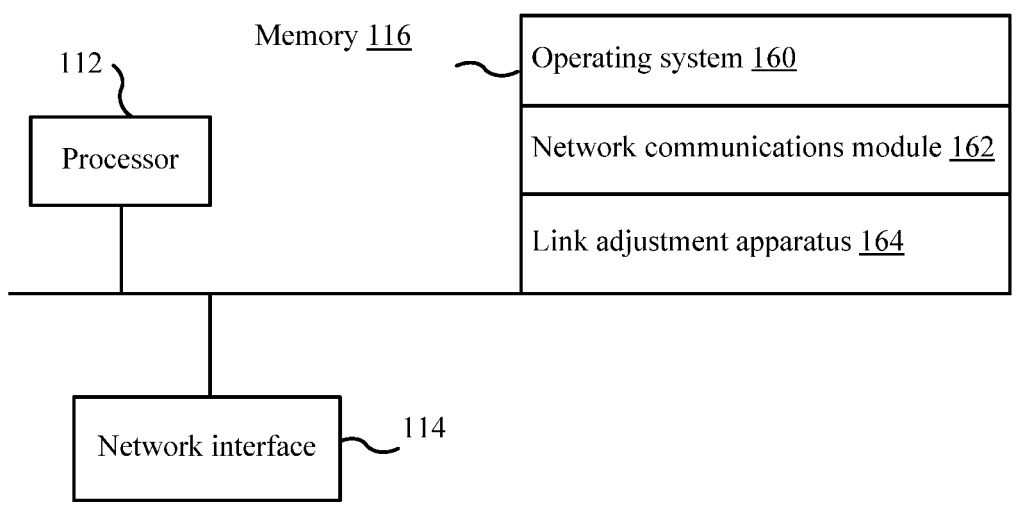
FIG. 1B is a schematic diagram of a server of a network call system according to an embodiment of this application.

FIG. 1B is a schematic diagram of a server of a network call system according to an embodiment of this application. The server is the server 11 in FIG. 1A. As shown in FIG. 1B, the server may include a processor 112, a network interface 114, and a memory 116. The memory 116 includes an operating system 160, a network communications module 162, and a link adjustment apparatus 164. The link adjustment apparatus 164 may be implemented by computer readable instructions.

The link adjustment apparatus 164 may implement link adjustment methods in the embodiments of this application. For example, the link adjustment apparatus 164 collects call information of users currently in network calls in the network call system, and makes a collective decision about link switching for a plurality of users whose relay link quality is higher than direct link quality, so that overall communication quality of the users in the network call system reaches an expectation.

Figure 1C:
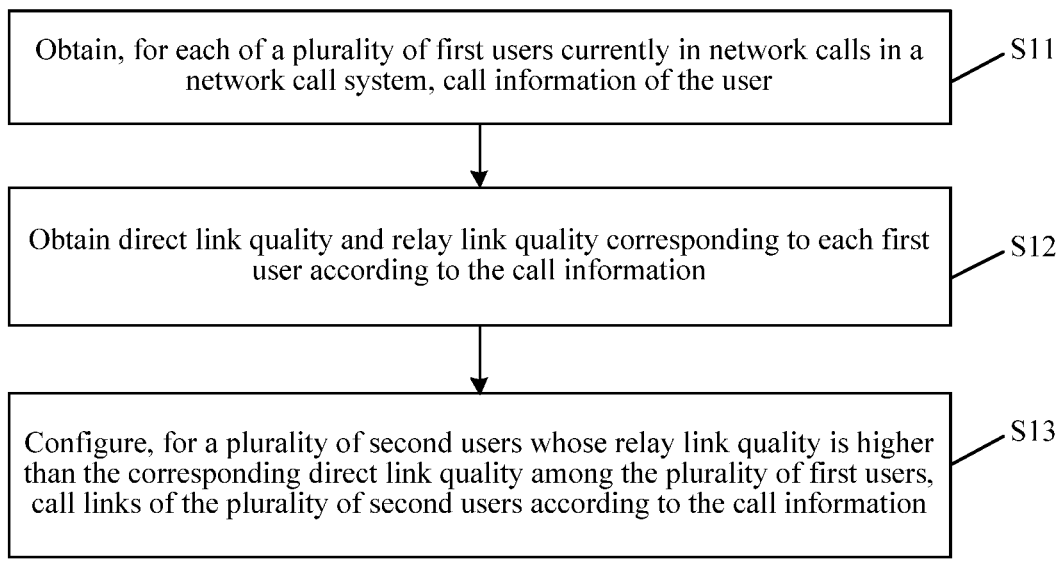
FIG. 1C is a flowchart of a link adjustment method according to an embodiment of this application.

FIG. 1C is a flowchart of a link adjustment method according to an embodiment of this application. The method may be applied to the server 11 in the network call system shown in FIG. 1A. The method may include the following steps:

Step S11. Obtain call information of a plurality of first users currently in network calls in the network call system.

The call information may include direct link quality and relay link quality of the user. A direct link is a call link not using a private line network of the network call system. A relay link is a call link using the private line network of the network call system as a relay. Call data of the user is transmitted by one of the direct link and the relay link.

Herein, a direct link and a relay link of a user each is a one-way link from the user to a call peer end; a direct link and a relay link from the call peer end to the user are referred to as a direct link and a relay link of a user corresponding to the call peer end. In a server, two groups of one-way call links between a pair of call users are considered as respective call links of the two users, and decisions are made respectively.

Step S12. Obtain direct link quality and relay link quality corresponding to each first user according to the call information.

Step S13. Configure, for a plurality of second users whose relay link quality is higher than the corresponding direct link quality among the plurality of first users, call links of the plurality of second users according to the call information.

In step S13, for a plurality of second users whose relay link quality is higher than direct link quality among the first users, a plurality of third users that causes a total link quality gain of the plurality of second users to have a maximum value not greater than an expected value is selected from the plurality of second users according to the call information of the plurality of second users; the plurality of third users is decided as users using relay links, and each of the plurality of second users except the plurality of third users is decided as a user using a direct link. The total link quality gain of the plurality of second users is a sum of link quality gains obtained by the plurality of users using relay links decided among the plurality of second users compared with using direct links. A link used for a call of each of the plurality of third users is adjusted to be a relay link, and a link used for a call of each of the plurality of second users except the plurality of third users is adjusted to be a direct link.

In some embodiments, a decision result of call links used by the plurality of second users can be expressed by using a decision vector. Elements in the decision vector correspond to the plurality of second users in a one-to-one manner. A value of each element indicates whether a call link of a second user corresponding to the element is decided to be a direct link or a relay link. For example, if a value of an element is 0, it indicates a decision that a user corresponding to the element uses a direct link; if a value of an element is 1, it indicates a decision that a user corresponding to the element uses a relay link. Values of elements in the decision vector that correspond to the plurality of third users are values representing relay links, and values of elements in the decision vector that correspond to users except the third users are values representing direct links. For example, if the selected third users are a user 2, a user 3, and a user 5, the decision vector can be expressed as {0, 1, 1, 0, 1}.

In this specification, the step of selecting a plurality of third users from the second users as users decided to use relay links is also briefly referred to as determining a decision vector corresponding to the second users.

For example, for a call of a user r, SDr represents direct link quality, and SRr represents a relay link quality; if SRr>SDr, a link quality gain obtained by the user r can be expressed as ε(r)=SRr−SDr. A sum of link quality gains obtained by the plurality of third users is $$q = \sum_{i=1}^{\lambda} \varepsilon(i) * I(i),$$

where λ represents the quantity of the third users, and I(i) represents a value of an element that is in the decision vector and that corresponds to an $i^{th}$ user. That is, a call link of the it user is decided to be a direct link. For example, I(i)=0 represents that the call link is decided to be a direct link, and I(i)=1 represents that the call link is decided to be a relay link.

During link adjustment according to the decision vector, when a call link of a user determined according to the decision vector is consistent with a current call link of the user (that is, both links are direct links or relay links), the call link of the user may not be processed. When a call link of a user determined according to the decision vector is inconsistent with a current call link of the user, the call link of the user is switched. That is, the call link is switched from a direct link to a relay link or from a relay link to a direct link.

In some examples, the expected value may be calculated by using a preset expected value of a load average of the network call system and an expected value of a link quality gain obtained by using a relay link for a single call as compared with using a direct link. For example, the expected value may be $\bar{\varepsilon} \times \bar{\lambda}$, where E represents an expected value of a link quality gain obtained by a user using a relay link as compared with using a direct link, and A represents an expected value of the quantity of users using relay links in the network call system.

In some examples, time periods may be obtained through division. Call information is collected in each time period, and call links used by users in a next time period are decided. For example, the call information may be obtained in a first time period in a plurality of preset time periods; and the link used for the call of each of the plurality of second users in a time period next to the first time period is adjusted to be a link indicated by a value of an element that is in the decision vector and that corresponds to the second user. In some examples, the first time period is a time period in which the current time point is located.

In some examples, when the current time period is the first time period, an accumulated gain in a second time period may be obtained. The second time period is a time period previous to the first time period. The accumulated gain in the second time period is the larger one of zero and a sum of an accumulated gain in a time period previous to the second time period and a gain difference in the second time period.

That is, when the sum is greater than zero, the accumulated gain in the second time period is the sum; when the sum is less than zero, the accumulated gain in the second time period is zero. The gain difference is a difference between a preset expected system gain value and a total gain in the second time period. The total gain is a sum of link quality gains obtained by a plurality of fourth users using relay links compared with using direct links according to a decision vector of the second time period. That is, A(t−1)=max[A(t−2)+$\bar{\varepsilon} \times \bar{\lambda}$−q(t−1), 0], where A(t−1) is the accumulated gain in the second time period, A(t−2) is the accumulated gain in the time period previous to the second time period, q(t−1) is a total gain of relay links that is generated according to the decision vector of the second time period, that is, a sum of link quality gains obtained by a plurality of users using relay links decided in the second time period compared with using direct links, and $\bar{\varepsilon} \times \bar{\lambda}$−q(t−1) is the gain difference in the second time period.

After that, the decision vector can be determined. The decision vector causes a sum of link quality gains obtained by at least one third user each using a relay link among the plurality of second users compared with using a direct link to have a maximum value not greater than the expected value. The expected value is a sum of the expected system gain value and the gain difference. That is, the decision vector can make the following expression true:

$$q(t) = \begin{cases} \max(q(t)), & \text{if } \max(q(t)) <= A(t-1) + \bar{\varepsilon} \times \bar{\lambda}, \\ A(t-1) + \bar{\varepsilon} \times \bar{\lambda}, & \text{if } \max(q(t)) > A(t-1) + \bar{\varepsilon} \times \bar{\lambda}. \end{cases}$$

In some examples, users currently in calls may be preprocessed first. The preprocessing may include at least one of the following:

deciding, for at least one fifth user whose relay link quality is not higher than the corresponding direct link quality among the plurality of first users, that a call link of the at least one fifth user is a direct link;

deciding, for at least one sixth user whose relay link is interrupted among the plurality of first users, that a call link of the at least one sixth user is a direct link; or deciding, for at least one seventh user whose direct link is interrupted among the plurality of users, that a call link of the at least one seventh user is a relay link.

In this way, the plurality of second users is users among the plurality of first users except the at least one fifth user, the at least one sixth user, and the at least one seventh user. Therefore, the computing amount in collective decision making can be reduced.

In some examples, the plurality of third users may be selected according to a preset bandwidth, where the plurality of third users causes the total link quality gain of the plurality of second users to be the maximum value not greater than the expected value, and a total bandwidth occupied by the plurality of third users is not greater than the preset bandwidth. When obtaining the call information of each user, the server may further obtain a bandwidth for the call of each user. The decision vector meets $$\sum_{i=1}^{\lambda} BR(i) * I(i) \le b,$$

where λ is the quantity of the second users, I(i) is a value of an element that is in the decision vector and that corresponds to the $i^{th}$ user, and b is the preset bandwidth.

In some examples, decision vectors may further be calculated for a plurality of preset candidate bandwidths respectively, and a decision vector corresponding to a specific candidate bandwidth is selected from the decision vectors, so that the bandwidth can be adjusted dynamically and that the sum of link quality gains is closer to the expected value. For example, for each candidate bandwidth in the plurality of preset candidate bandwidths, a group of third users (or a second decision vector) corresponding to the candidate bandwidth may be determined, and the group of third users cause the total link quality gain of the plurality of second users to be the maximum value not greater than the expected value, and a total bandwidth occupied by the group of third users is not greater than the candidate bandwidth. According to all the candidate bandwidths and a sum of link quality gains of all the groups of third users corresponding to all the candidate bandwidths, a group of third users are selected as the plurality of third users decided to use relay links. For example, a second decision vector that maximizes the sum of link quality gains may be selected from the second decision vectors. For another example, a second decision vector corresponding to a minimum candidate bandwidth may be selected from second decision vectors corresponding to sums, which meet a preset condition (for example, greater than a preset threshold), of link quality gains. For another example, the sum of the link quality gains corresponding to each second decision vector and the corresponding candidate bandwidth may be substituted in a preset algorithm, and a second decision vector corresponding to a value meeting a condition (such as a maximum value or a minimum value) is selected by using a calculated value. A specific selection method is not limited herein, and can be determined according to actual requirements.

In some examples, during a dynamic decision making process based on different time periods, the call information may be obtained in a first time period in a plurality of preset time periods, and one of second decision vectors corresponding to a plurality of candidate bandwidths is selected as the decision vector according to the following method:

obtaining an accumulated gain in each third time period prior to the first time period, where the accumulated gain in the third time period is the larger one of zero and a sum of an accumulated gain in a time period previous to the third time period and a gain difference in the third time period, the gain difference is a difference between a preset expected system gain value and a total link quality gain in the third time period, and the total link quality gain is a sum of link quality gains obtained by a plurality of fourth users using relay links decided in the third time period compared with using direct links;

calculating, for each candidate bandwidth in the plurality of preset candidate bandwidths, an accumulated gain corresponding to the candidate bandwidth, where the accumulated gain is the larger one of zero and a sum of an accumulated gain in a time period previous to the first time period and a gain difference corresponding to the candidate bandwidth, the gain difference is a difference between the preset expected system gain value and a total link quality gain corresponding to the candidate bandwidth, and the total link quality gain is a sum of link quality gains obtained by a group of third users corresponding to the candidate bandwidth that use relay links decided compared with using direct links;

calculating, for each candidate bandwidth in the plurality of preset candidate bandwidths, a variation between a first array and a second array that correspond to the candidate bandwidth, where the first array includes the accumulated gain corresponding to the candidate bandwidth and the accumulated gain in each third time period Q(t)={A(1), A(2), . . . , A(t−1), A($t_{b1}$)}, and the second array includes a gain difference in each third time period Q(t)={A(1), A(2), . . . , A(t−1), A($t_{b1}$)}, where A($t_{b1}$) is an accumulated gain corresponding to a candidate bandwidth b1 in the first time period;

calculating, for each candidate bandwidth in the plurality of preset candidate bandwidths, a score of the candidate bandwidth by using the variation of the candidate bandwidth and cost of the candidate bandwidth; and selecting, from the plurality of candidate bandwidths, a group of third users corresponding to a candidate bandwidth having a score meeting a preset condition (for example, being maximum or minimum) as the plurality of third users decided to use relay links, that is, using a second decision vector corresponding to the candidate bandwidth as the decision vector.

For example, the score of the candidate bandwidth may be calculated by using the variation of the candidate bandwidth and the cost of the candidate bandwidth according to Δ(Q(t))+V*C(b*$T_0$). In this case, selecting one second decision vector from the second decision vectors corresponding to the candidate bandwidths is equivalent to determining a candidate bandwidth b from the candidate bandwidths {$b_0$, $b_1$, . . . , $b_n$}, where the second decision vector $\vec{1}$ corresponding to the candidate bandwidth b can minimize Δ(Q(t))+V*C(b*$T_0$), that is, $\min_{b,\vec{1}}$(Δ(Q(t))+V*C(b*$T_0$)), where Δ(Q(t))=L(Q(t))−L(Q(t−1)) is the variation between the first array Q(t) and the second array Q(t−1); L( ) represents the magnitude of an array, may be an operation such as a modulo operation, and may be set according to a requirement; V is a weighted value that is set according to an actual requirement, C( ) represents a bandwidth pricing function, and $T_0$ is a preset length of each time period.

In the embodiments, the decision vector may be determined by using various algorithms for an optimal solution, for example, a method of exhaustion, a heuristic algorithm, a genetic algorithm, a simulated annealing algorithm, a hill climbing method, or a custom algorithm. For example, in the method of exhaustion, all candidate decision vectors meeting the condition may be listed, total link quality gains corresponding to the candidate decision vectors are calculated, and a decision vector corresponding to a maximum value not greater than an expected value is selected from the candidate decision vectors. For another example, according to a custom algorithm, a link quality gain that can be obtained by each user (such as each second user), for whom a decision needs to be made, when using a relay link as compared with using a direct link may be calculated first; the users are sorted according to the link quality gains; in descending order of the link quality gains, the users are added to a set one by one, and a sum of link quality gains of users in the set is calculated. When a sum of link quality gains of users in the set is greater than an expected value after a user is added to the set, the user is removed from the set; users following the user are added to the set one by one, until a user added to the set can make a sum of link quality gains of users in the set not greater than the expected value. In this case, the users in the set are decided as users using relay links, and a decision vector is correspondingly generated. A value of an element that is in the decision vector and that corresponds to a user in the set indicates that the user is decided to use a relay link, and values of elements corresponding to other users indicate that the users are decided to use direct links. Processes of calculating a decision vector by using other algorithms are not elaborated herein.

Figure 2:
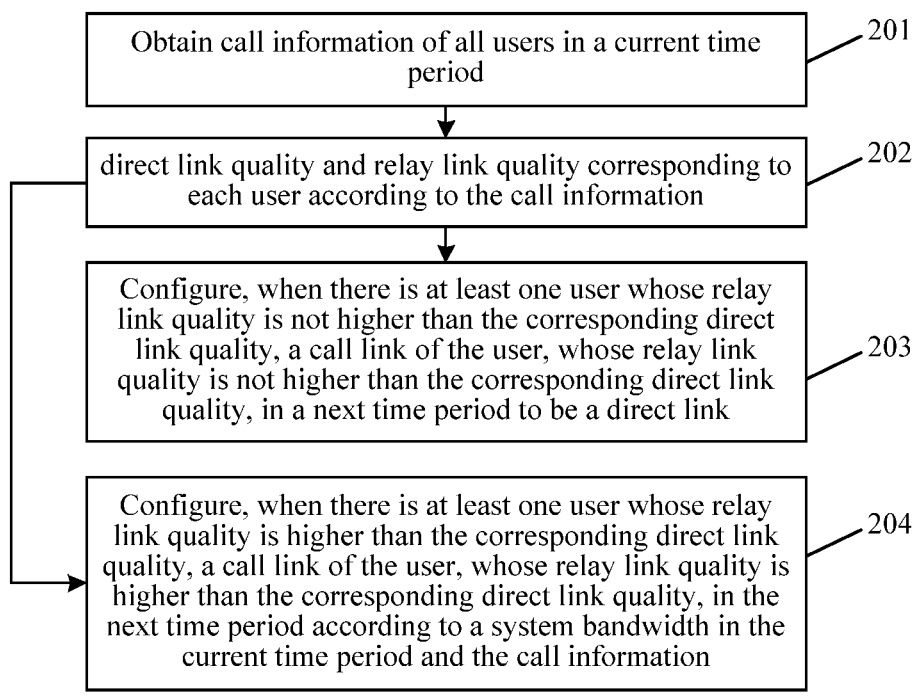
FIG. 2 is a flowchart of a link adjustment method according to an embodiment of this application.

The following helps understanding of technical solutions in the embodiments by using dynamic link adjustment based on different time periods as an example. FIG. 2 is a flowchart of a link adjustment method according to an embodiment of this application. The method may include the following steps:

S101. Obtain call information of all users in a current time period.

S102. Obtain direct link quality and relay link quality corresponding to each user according to the call information.

S103. Configure, when there is at least one user whose relay link quality is not higher than the corresponding direct link quality, a call link of the user, whose relay link quality is not higher than the corresponding direct link quality, to be a direct link in a next time period.

S104. Configure, when there is at least one user whose relay link quality is higher than the corresponding direct link quality, a call link of the user, whose relay link quality is higher than the corresponding direct link quality, in the next time period according to a system bandwidth in the current time period and the call information.

As shown in FIG. 1A, in a time period during a call, the client 21 may send data through the link L0 or the link T1→link T2→link T3. The client 21 may report call information to the server. The server obtains relay link quality and direct link quality according to the call information; according to the relay link quality, the direct link quality, and the current system bandwidth, the server decides whether the client 21 transmits data through the direct link L0 or through the relay link (link T1→link T2→link T3) in the next time period, and delivers a decision instruction to the client 21. The client 21 transmits data by using a corresponding link in the next time period according to the decision instruction. In actual application, a plurality of users in the system may be in VVoIP calls in the same time period. Therefore, the server needs to make a global link switching decision for the plurality of users in each time period.

As shown in FIG. 1A, the system to which the link adjustment method provided in this embodiment of this application is applied includes a server 11 for making a link switching decision (referred to as a server for short in this specification), a plurality of users, and a plurality of transit servers 31 to 3N. An entity performing steps S101 to S104 in this embodiment of this application may be located on the server 11 in the decision system. The plurality of users and the plurality of transit servers may form a VVoIP system.

The server may divide a operational cycle of the VVoIP system into a plurality of time periods, and configure the plurality of time periods to the client of each user. In a feasible implementation solution, duration of each time period may be fixed, or duration of each time period may be adjusted according to a preset changing policy.

In this embodiment of this application, the duration of each time period may be exactly equal. That is, the server may divide the operational cycle of the VVoIP system into a plurality of time periods with equal duration. Alternatively, the time periods may have different duration. Alternatively, some of the time periods may have equal duration, and other time periods may have different duration. This is not specifically limited in this embodiment of this application.

In some embodiments, as shown in FIG. 1A, at the beginning of each time period, clients (the client 21 to the client 2N in FIG. 1A) of all users currently in calls may separately send link switching requests (which may also be referred to as call information reports) to the server. The link switching request carries respective call information of the user. In this way, the server can obtain call information of all the users in the current time period. Then, the server makes a link decision according to the call information, that is, performs steps S101 to S104. According to a result of the link decision, all the users (the client 21 to the client 2N in FIG. 1A) use corresponding links to transmit data in a time period next to the current time period. That is, the server decides, in each time period, links to be used by users in the next time period.

It should be noted that, the call information includes call information of the direct link and call information of the transmit link of the user. In each time period, although the user can use only one of the direct link and the relay link to transmit data, the other of the direct link and the relay link still needs to be kept alive. The user may send a keep-alive data packet on the other link not used, to keep the other link alive. Therefore, a communication behavior exists. Therefore, the client of the user can still obtain communication information of the link not used.

In a feasible implementation solution, the call information may include, but is not limited to: packet loss data, latency data, jitter data, and a bit rate of transmitted data of the link.

In this embodiment of this application, the server may obtain the direct link quality and the relay link quality corresponding to each user according to the received call information reported by the clients of all the users.

In some embodiments, the server may calculate the direct link quality according to the packet loss data, latency data, and/or jitter data in the call information of the direct link and by using an E-Model of the International Telecommunication Union (ITU). Similarly, the server further needs to calculate the relay link quality according to the packet loss data, latency data, and/or jitter data in the call information of relay link and by using the E-Model of the ITU.

In some embodiments, after obtaining the relay link quality and the direct link quality of each user, the server may compare the quality of two links of the same user. If there is at least one user whose relay link quality is not higher than the corresponding direct link quality, a call link in a next time period of the user whose relay link quality is not higher than the corresponding direct link quality is configured to be a direct link. In other words, the user uses the direct link in the next time period to transmit data to a peer user of the call.

In some examples, implementations for configuring a call link of the user, whose relay link quality is not higher than the corresponding direct link quality, to be a direct link in a next time period may include, but are not limited to the following:

In the first implementation, the server sends a decision instruction to each user whose relay link quality is not higher than the corresponding direct link quality, where the decision instruction carries an identifier of a direct link, and the identifier is used for indicating that a link to be used in the next time period is a direct link. For example, the decision instruction carries 0, indicating that a link to be used in the next time period is a direct link.

It should be understood that, the user receiving the decision instruction may use, in the next time period, a link the same as that in the current time period. That is, it is unnecessary to perform link switching, and the user still uses the direct link in the next time period. In other words, the user needs to learn of a link to be used in the next time period, even if the link is the same as the link used in the current time period. That is, both links are direct links. Alternatively, the user receiving the decision instruction may use, in the next time period, a link different from that in the current time period. That is, the user needs to perform link switching to switch the link from a relay link to a direct link.

In the second implementation, the server identifies each user whose relay link quality is not higher than the corresponding direct link quality, to identify each user currently using a direct link and each user currently using a relay link. Because the user currently using a relay link needs to switch from the relay link to a direct link in the next time period, the server may deliver a decision instruction to the user currently using a relay link, where the decision instruction may carry an identifier of a direct link. The user receiving the decision instruction may use a direct link in the next time period according to the identifier carried in the decision instruction.

Because the user currently using a direct link still uses the direct link in the next time period and switching is not needed, the server may not deliver a decision instruction to the user currently using a direct link. If the user does not receive the decision instruction, link switching is not performed, and the user still uses the current link, that is, the direct link, in the next time period to transmit data to a peer user. In this way, the quantity of decision instructions delivered by the server can be reduced, thereby reducing processing load of the server.

In the third implementation, the server identifies each user whose relay link quality is not higher than the corresponding direct link quality, to identify each user currently using a direct link and each user currently using a relay link. Because the user currently using a relay link needs to switch from the relay link to a direct link in the next time period, the server may deliver a decision instruction to the user currently using a relay link, where the decision instruction does not carry an identifier. As long as the user receives the decision instruction, the user performs link switching in the next time period, thereby switching from the relay link to a direct link.

Because the user currently using a direct link still uses the direct link in the next time period and switching is not needed, the server may not deliver a decision instruction to the user currently using a direct link. If the user does not receive the decision instruction, link switching is not performed, and the user still uses the current link, that is, the direct link, in the next time period to transmit data to a peer user. In this way, the quantity of decision instructions delivered by the server can be reduced, thereby reducing processing load of the server.

Figure 3:
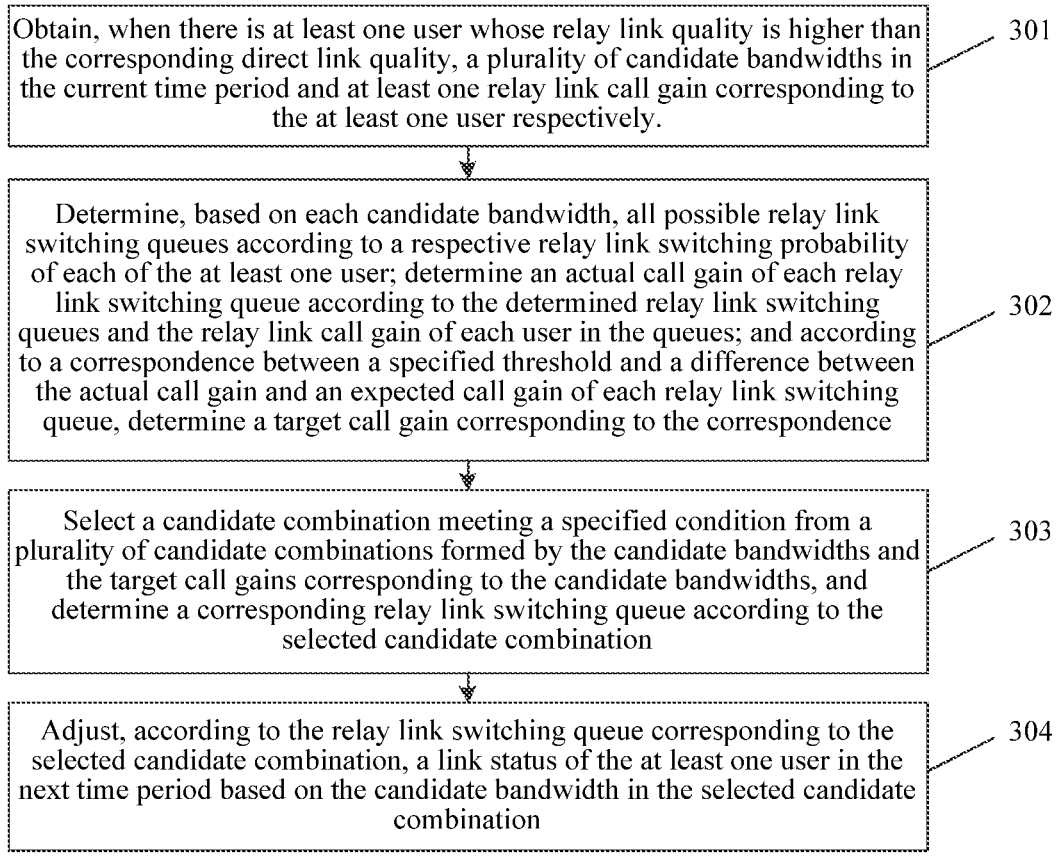
FIG. 3 is a flowchart of a method for implementing step S104 in the flowchart of FIG. 2 according to an embodiment of this application.

For implementation of step S104, this embodiment of this application provides a feasible implementation herein. As shown in FIG. 3, the method may include the following steps:

S301. Obtain, when there is at least one user whose relay link quality is higher than the corresponding direct link quality, a plurality of candidate bandwidths in the current time period and at least one relay link call gain corresponding to the at least one user respectively.

It is assumed that an operational cycle of a VVoIP system is uniformly divided into a plurality of time periods with duration of $T_0$. In a time period t, the server receives at least one link switching request $\lambda(t)$ sent by at least one user. The link switching requests $\lambda(t)$ are sent by users whose relay link quality is higher than the corresponding direct link quality, and direct links of these users are available. Therefore, the at least one link switching request $\lambda(t)$ has a one-to-one correspondence with the at least one user. It can be understood that, the quantity of the at least one user is also equal to $\lambda(t)$.

For a link switching request r (which may also be referred to as a user r), the server obtains the following information:

$SD_r$, representing direct link quality of the user r;

$SR_r$, representing relay link quality of the user r; and $BR_r$, representing a bit rate of data transmitted by the user r.

If the user r uses a relay link in the next time period, a relay link call gain corresponding to the user r is obtained by using the following formula:

$$\Sigma(r) = SR_r - SD_r, SR_r > SD_r.$$

$\varepsilon(r)$ represents the relay link call gain of the user r, $SR_r$ represents relay link quality of the user r, and $SD_r$ represents direct link quality of the user r.

It should be noted that, it can be learned that $\varepsilon(r) > 0$ according to the formula.

A relay link call gain corresponding to each of the at least one user whose relay link quality is higher than the corresponding direct link quality may be obtained by using the foregoing method.

S302. Determine, based on each candidate bandwidth, all possible relay link switching queues (that is, decision vectors) according to a respective relay link switching probability of each of the at least one user; determine an actual call gain of each relay link switching queue according to the determined relay link switching queues and the relay link call gain of each user in the queues; and according to a correspondence between a specified threshold and a difference between the actual call gain and an expected call gain of each relay link switching queue, determine a target call gain corresponding to the correspondence.

S303. Select a candidate combination meeting a specified condition from a plurality of candidate combinations formed by the candidate bandwidths and the target call gains corresponding to the candidate bandwidths, and determine a corresponding relay link switching queue according to the selected candidate combination.

The following characteristic function is set to identify a link switching decision made by the server for a call of the user r in a specific time period:

$$I(r) = \begin{cases} 0, \text{ decide to use a direct link} \\ 1, \text{ decide to use relay link} \end{cases}$$

The characteristic function represents that if the user r uses a relay link, the characteristic function thereof, namely, a relay link switching probability, is equal to 1; if the user r uses a direct link, the characteristic function thereof, namely, a direct link switching probability, is equal to 0.

It should be noted that, by permutation according to the link switching decision of each of the at least one user, all possible relay link switching queues can be obtained. Each relay link switching queue is a data sequence formed by 1 and/or 0. Further, for each relay link switching queue, a relay link call gain $\varepsilon(r)$ of each user in the queue is obtained by using the foregoing formula.

In the time period t, a total call gain obtained by all users using relay links can be expressed as:

$$q(t) = \sum_{i=1}^{\lambda(2)} \varepsilon(r_1) * l(r_1)$$

where q(t) represents a total call gain, for a relay link switching queue, obtained by all users using relay links in the time period t, that is, an actual call gain of a relay link switching queue; $\varepsilon(r_i)$ represents a relay link call gain of a user, and i is used for representing different users in a summation process; $l(r_i)$ represents a link switching decision made by the server for a call of a user in the time period t.

In a feasible implementation solution, a bandwidth budget may be made according to current load of the VVoIP system. It is assumed that a bandwidth b(t) is occupied in the time period t; $C(b(t)*T_0)$ is used for representing a bandwidth expense in the time period t, where C(x) represents a bandwidth pricing function for calculating the bandwidth expense.

In this embodiment of this application, it is expected to reduce the bandwidth expense as much as possible and lower the system load while ensuring call quality. To resolve this problem, a virtual queue is defined: Q(t+1)={B(1), B(2), . . . , B(t+1)}, where the element B(t+1) in the virtual queue Q(t+1) meets the following formula:

$$B(t+1) = \max[B(t) + \bar{\varepsilon} \times \bar{\lambda} - q(t), 0]$$

where B(t+1) represents an accumulated call gain to be substituted in the next time period, that is, A(t) mentioned above; $\bar{\varepsilon} \times \bar{\lambda}$ represents an expected call gain, $\bar{\varepsilon}$ is an expectation of $\varepsilon(r)$, represents a link quality gain of each relay link switching queue, and is a quantized value of an expected quality improvement achieved by using a relay link as compared with using a direct link; $\bar{\lambda}$ is an expectation of $\lambda(t)$ and represents an expectation of the quantity of links to be adjusted; B(t+1) actually can measure an accumulated value of differences between call gains expected from relay links and actual call gains, where a larger value of B(t+1) indicates a smaller value of a total call gain q(t) of relay links.

A function related to Q(t) is defined as follows:

$$L(Q(t)) = \frac{1}{2}Q^2(t)$$

ΔQ(t) is used for representing a variation of a virtual queue in two neighboring time periods with respect to the function, and a smaller value of the variation ΔQ(t) indicates higher stability of the virtual queue:

$$\Delta Q(t) = L(Q(t+1)) - L(Q(t))$$

The objective of reducing the bandwidth expense as much as possible and lowering the system load while ensuring the call quality can be expressed with the following model:

$$\min_{b(t),\bar{\lambda}(t)} (\Delta(Q(t)) + V * C(b(t) * T_0))$$

$$\text{where } \sum_{i=1}^{\lambda(t)} BR(r_i) * I(r_i) \leq b(t)$$

That is, a candidate combination (that is, a target bandwidth b(t) and a relay link switching queue $\vec{l}(t)$) needs to be found in a plurality of candidate combinations, where the target bandwidth b(t) and the relay link switching sequence l(t) can minimize $\Delta(Q(t)) + V*C(b(t)*T_0)$ on the premise that an accumulated value of bandwidths of relay links of the users does not exceed the given candidate bandwidth b(t). In this way, the objective of reducing the bandwidth expense as much as possible and lowering the system load while ensuring the call quality can be achieved. That is, the stability of the virtual queue is maintained, so that the overall call quality of the system is close to a preset expected value.

where b(t) represents a candidate bandwidth of the current time period t in the candidate combination; $T_0$ represents duration of the current time period; $\Delta(Q(t))$ is obtained according to a target call gain q(t) in the candidate combination; V represents a controllable parameter; $C(b(t)*T_0)$ represents a bandwidth expense of the current time period; and $\vec{l}(t)$ represents a relay link switching queue in the candidate combination.

The magnitude of b(t) can influence the value of $C(b(t)*T_0)$, and $\vec{l}(t)$ can influence the value of $\Delta(Q(t))$. In fact, both b(t) and $\vec{l}(t)$ are variables in the foregoing formula. Therefore, dimensions of the foregoing formula need to be reduced by using a method of exhaustion. That is, enumeration is performed on one variable, and then a minimum value of the other variable is found. In this embodiment of this application, enumeration is performed on the candidate bandwidth b(t) to set values of b(t) in sequence, where $b(t) = \in \{b_0, b_1, \ldots, b_n\}$; then, a relay link switching queue $\vec{l}(t)$ that can minimize $\Delta(Q(t))$ is calculated based on all the bandwidth values.

According to the following formulas:

$$B(t+1) = \max[B(t) + \bar{\varepsilon} \times \bar{\lambda} - q(t), 0]$$

$$L(Q(t)) = \frac{1}{2}Q^2(t)$$

$$\Delta Q(t) = L(Q(t+1)) - L(Q(t))$$

it is obtained that when $q(t) > B(t) + \bar{\varepsilon} \times \bar{\lambda}$, the value of $B(t) + \bar{\varepsilon} \times \bar{\lambda} - q(t)$ is less than 0. Therefore B(t+1)=0, thereby obtaining $$\Delta Q(t) = Q - \frac{1}{2}Q^2(t) = -\frac{1}{2}Q^2(t)$$

$$\Delta Q(t) = -\frac{1}{2}Q^2(t)$$

is a downward parabola.

Because $B(t+1) = \max[B(t) + \bar{\varepsilon} \times \bar{\lambda} - q(t), 0]$, it can be determined that B(t) is always not less than 0. To minimize ΔQ(t), according to $$\Delta Q(t) = -\frac{1}{2}Q^2(t),$$

it is learned that Q(t) needs to be maximized. Because $q(t) > B(t) + \bar{\varepsilon} \times \bar{\lambda}$, it can be obtained that $B(t) < q(t) - \bar{\varepsilon} \times \bar{\lambda}$, where an extreme value of B(t) is equal to $q(t) - \bar{\varepsilon}\bar{\lambda}$. To make $q(t) = B(t) + \bar{\varepsilon} \times \bar{\lambda}$, a maximum value max(q(t)) of all possible values of q(t) needs to be greater than $B(t) + \bar{\varepsilon} \times \bar{\lambda}$. Therefore, it is obtained that:

when a correspondence between a specified threshold B(t) and a difference between the actual call gain q(t) and the expected call gain $\bar{\varepsilon} \times \bar{\lambda}$ of each relay link switching queue meets max(q(t))−$\bar{\varepsilon} \times \bar{\lambda}$≥B(t), it is determined that a target call gain q(t) corresponding to the correspondence is B(t)+$\bar{\varepsilon} \times \bar{\lambda}$.

That is, the foregoing model can also be expressed as q(t)=B(t)+$\bar{\varepsilon} \times \bar{\lambda}$, if max(q(t))≥B(t)+$\bar{\varepsilon} \times \bar{\lambda}$.

That is, when the value of q(t) is set according to the foregoing formula, ΔQ(t) can be minimized.

where max(q(t)) represents an actual call gain of each relay link switching queue; EA represents an expected call gain; E represents a link quality gain of each relay link switching queue; A represents an expectation of a link to be adjusted; and B(t) can represent a specified threshold, indicating an accumulated value of differences between call gains expected from relay links and actual call gains.

When q(t)≤B(t)+$\bar{\varepsilon} \times \bar{\lambda}$, the value of B(t)+$\bar{\varepsilon} \times \bar{\lambda}$−q(t) is greater than 0. Therefore, B(t+1)=B(t)+$\bar{\varepsilon} \times \bar{\lambda}$−q(t), thereby obtaining ΔQ(t)=[Q(t+1)]²−[Q(t)]². This is an upward parabolic function based on q(t), and q(t) is greater than 0. It can be obtained according to a vertex formula of the parabolic function that when q(t)=B(t)+$\bar{\varepsilon} \times \bar{\lambda}$, ΔQ(t) is minimized. It can be inferred that when max(q(t))≤B(t)+$\bar{\varepsilon} \times \bar{\lambda}$, any q(t) meets q(t)≤B(t)+$\bar{\varepsilon} \times \bar{\lambda}$. It can be learned according to a monotonic decreasing feature of ΔQ(t) within a value range of q(t) that, when q(t)=max(q(t)), ΔQ(t) is minimized.

Therefore, when the correspondence between the specified threshold B(t) and the difference between the actual call gain q(t) and the expected call gain $\bar{\varepsilon} \times \bar{\lambda}$ of each relay link switching queue meets the formula max(q(t))−$\bar{\varepsilon} \times \bar{\lambda}$<B(t), it is determined that a target call gain q(t) corresponding to the correspondence is max(q(t)).

That is, the foregoing model can also be expressed as q(t)=max(q(t)), if max(q(t))<B(t)+$\bar{\varepsilon} \times \bar{\lambda}$.

That is, when the value of q(t) is set according to the foregoing formula, ΔQ(t) can be minimized.

where max(q(t)) represents an actual call gain of each relay link switching queue; $\bar{\varepsilon} \times \bar{\lambda}$ represents an expected call gain; $\bar{\varepsilon}$ represents a link quality gain of each relay link switching queue; $\bar{\lambda}$ represents an expectation of a link to be adjusted; and B(t) can represent a specified threshold, indicating an accumulated value of differences between call gains expected from relay links and actual call gains.

According to the foregoing determining manner, each b(t) corresponds to a q(t) that can minimize ΔQ(t). In this case, a plurality of candidate combinations formed by various candidate bandwidths (b(t)) and corresponding target call gains (q(t)) can be determined.

Then, at least one candidate combination (b(t) and q(t)) meeting the foregoing model is determined in all the candidate combinations. Because q(t) needs to be obtained according to the relay link switching sequence $\bar{I}$(t), the relay link switching sequence $\bar{I}$(t) corresponding to the candidate combination q(t) can be obtained.

S304. According to the relay link switching queue corresponding to the selected candidate combination, adjust a link status of the at least one user in the next time period based on the candidate bandwidth in the selected candidate combination.

Each value in the relay link switching sequence is used for identifying a link switching decision of a user. Therefore, link switching decisions of all the users can be obtained according to the relay link switching sequence, so that the link status of the at least one user in the next time period is adjusted according to the link switching decisions of the users. For example, the link status may include whether each user uses a relay link or a direct link in the next time period, the magnitude of a bandwidth of the used link, and the like.

In a feasible implementation solution, the server may adjust the link status of each user in the next time period by using a decision instruction. For example, there may be, but not limited to, the following implementation solutions:

In the first implementation solution, the server sends a decision instruction to each user whose relay link quality is higher than the corresponding direct link quality, where the decision instruction carries an identifier of a link, and the identifier is used for indicating whether a link to be used in the next time period is a direct link or a relay link. For example, if the decision instruction carries 0, it indicates that a link to be used in the next time period is a direct link. If the decision instruction carries 1, it indicates that a link to be used in the next time period is a relay link.

It can be understood that, the user receiving the decision instruction may use, in the next time period, a link the same as that in the current time period. That is, it is unnecessary to perform link switching, and the user still uses the same link in the next time period. In other words, the user needs to learn of a link to be used in the next time period, even if the link is the same as the link used in the current time period. That is, both links are direct links or relay links. Alternatively, the user receiving the decision instruction may use, in the next time period, a link different from that in the current time period. That is, the user needs to perform link switching to switch the link from a relay link to a direct link or from a direct link to a relay link.

In the second implementation solution, the server identifies each user whose relay link quality is higher than the corresponding direct link quality, to identify each user currently using a direct link and each user currently using a relay link. Then, the identification result is compared with the relay link switching sequence to obtain each user that needs to switch the link in the next time period. Next, the server delivers a decision instruction to each user that needs to switch the link, where the decision instruction may carry an identifier of a link to be switched to. The user receiving the decision instruction may use a corresponding link in the next time period according to the identifier carried in the decision instruction.

Because link switching is unnecessary for a user that does not need to switch the link, the server may not deliver a decision instruction to the user that does not need to switch the link. If the user does not receive the decision instruction, the user does not perform link switching and still uses the current link in the next time period to transmit data to a peer user. In this way, the quantity of decision instructions delivered by the server can be reduced, thereby reducing processing load of the server.

In the third implementation solution, the server identifies each user whose relay link quality is higher than the corresponding direct link quality, to identify each user currently using a direct link and each user currently using a relay link. Then, the identification result is compared with the relay link switching sequence to obtain each user that needs to switch the link in the next time period. Next, the server delivers a decision instruction to each user that needs to switch the link. However, the decision instruction does not carry an identifier. As long as the user receives the decision instruction, the user performs link switching in the next time period.

Because link switching is unnecessary for a user that does not need to switch the link, the server may not deliver a decision instruction to the user that does not need to switch the link. If the user does not receive the decision instruction, the user does not perform link switching and still uses the current link in the next time period to transmit data to a peer user. In this way, the quantity of decision instructions delivered by the server can be reduced, thereby reducing processing load of the server.

An embodiment of this application further provides an apparatus embodiment for implementing the steps and the method in the foregoing method embodiment.

Figure 4:
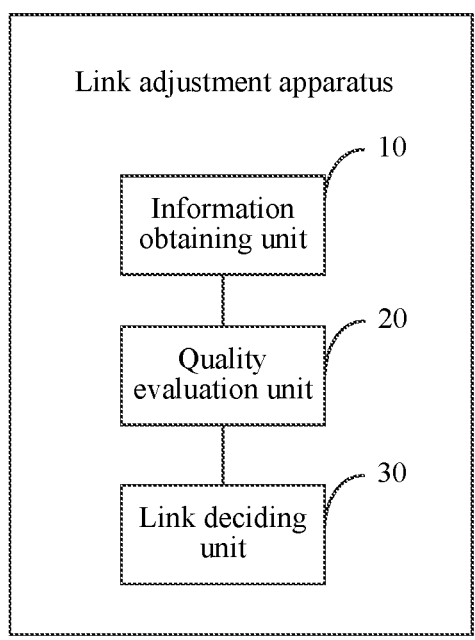
FIG. 4 is a block diagram of functions of a link adjustment apparatus according to an embodiment of this application.

FIG. 4 is a block diagram of functions of a link adjustment apparatus according to an embodiment of this application. As shown in FIG. 4, the apparatus includes:

an information obtaining unit 10, configured to obtain call information of all users in a current time period;

a quality evaluation unit 20, configured to obtain direct link quality and relay link quality corresponding to each user according to the call information;

a link deciding unit 30, configured to: when there is at least one user whose relay link quality is not higher than the corresponding direct link quality, configure a call link of the user, whose relay link quality is not higher than the corresponding direct link quality, to be a direct link in a next time period.

The link deciding unit 30 is further configured to: when there is at least one user whose relay link quality is higher than the corresponding direct link quality, configure a call link of the user, whose relay link quality is higher than the corresponding direct link quality, in the next time period according to a system bandwidth in the current time period and the call information.

In a feasible implementation solution, the link deciding unit 30 is specifically configured to:

obtain, when there is at least one user whose relay link quality is higher than the corresponding direct link quality, a plurality of candidate bandwidths in the current time period and at least one relay link call gain corresponding to the at least one user respectively;

determine, based on each candidate bandwidth, all possible relay link switching queues according to a respective relay link switching probability of each of the at least one user; determine an actual call gain of each relay link switching queue according to the determined relay link switching queues and the relay link call gain of each user in the queues; and according to a correspondence between a specified threshold and a difference between the actual call gain and an expected call gain of each relay link switching queue, determine a target call gain corresponding to the correspondence;

select a candidate combination meeting a specified condition from a plurality of candidate combinations formed by the candidate bandwidths and the target call gains corresponding to the candidate bandwidths, and determine a corresponding relay link switching queue according to the selected candidate combination; and adjust, according to the relay link switching queue corresponding to the selected candidate combination, a link status of the at least one user in the next time period based on the candidate bandwidth in the selected candidate combination.

In a feasible implementation solution, the link deciding unit 30 is specifically configured to:

determine, when the correspondence between the specified threshold and the difference between the actual call gain and the expected call gain of each relay link switching queue meets the formula $\max(q(t))-\overline{\varepsilon\lambda}<Q(t)$, that a target call gain corresponding to the correspondence is $\max(q(t))$.

where q(t) represents an actual call gain of each relay link switching queue; $\overline{\varepsilon\lambda}$ represents an expected call gain; $\overline{\varepsilon}$ represents a link quality gain of each relay link switching queue; $\overline{\lambda}$ represents an expectation of a link to be adjusted; and Q(t) is the specified threshold, indicating an accumulated value of differences between call gains expected from relay links and actual call gains.

In a feasible implementation solution, the link deciding unit 30 is specifically configured to:

determine, when a correspondence between a specified threshold and a difference between the actual call gain and the expected call gain of each relay link switching queue meets $\max(q(t))-\overline{\varepsilon\lambda}\geq Q(t)$, that a target call gain corresponding to the correspondence is $Q(t)+\overline{\varepsilon\lambda}$.

where q(t) represents an actual call gain of each relay link switching queue; $\overline{\varepsilon\lambda}$ represents an expected call gain; $\overline{\varepsilon}$ represents a link quality gain of each relay link switching queue; $\overline{\lambda}$ represents an expectation of a link to be adjusted; and Q(t) is the specified threshold, indicating an accumulated value of differences between call gains expected from relay links and actual call gains.

In a feasible implementation solution, the specified condition meets the following formula:

$$\min_{b(t),\vec{\lambda}(t)}(\Delta(Q(t))+V*C(b(t)*T_0))$$

where b(t) represents a candidate bandwidth of the current time period t in the candidate combination; $T_0$ represents duration of the current time period; $\Delta(Q(t))$ is represents a variation between of the specified threshold between two neighboring time periods, and $\Delta(Q(t))$ is obtained according to the target call gain in the candidate combination; V represents a controllable parameter; $C(b(t)*T_0)$ represents a bandwidth expense of the current time period; and $\vec{1}(t)$ represents a relay link switching queue in the candidate combination.

In a feasible implementation solution, the link deciding unit 30 is specifically configured to obtain a respective relay link call gain corresponding to each of the at least one user according to the following formula:

$$\varepsilon(r) = SR_r - SD_r, SR_r > SD_r$$

where $\varepsilon(r)$ represents a relay link call gain of a user r, $SR_r$ represents relay link quality of the user r, and $SD_r$ represents direct link quality of the user r.

Figure 5:
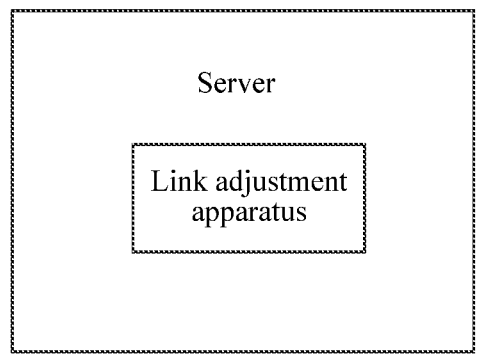
FIG. 5 is a schematic diagram of a server according to an embodiment of this application.

An embodiment of this application further provides a server. As shown in FIG. 5, the server includes the foregoing link adjustment apparatus.

Because the units in this embodiment can perform the methods shown in FIG. 1 to FIG. 3, for parts that are not detailed in this embodiment, reference may be made to related descriptions about FIG. 1 to FIG. 3.

The technical solutions in the embodiments of this application have the following beneficial effects:

In this embodiment of this application, when there is at least one user whose relay link quality is not higher than the corresponding direct link quality, a call link of the user, whose relay link quality is not higher than the corresponding direct link quality, in a next time period is configured to be a direct link. The relay link quality and the direct link quality are fully considered in the link switching decision process, and the decision can allow a link with better quality to be selected for a call preferably. Relay links are preferably allocated to users with poor direct link quality, thereby reducing random decisions or improper decisions caused by fixed threshold-based decision making.

In addition, a call link of a user, whose relay link quality is higher than the corresponding direct link quality, in the next time period is configured according to a system bandwidth and call information, instead of simply making a decision directly to use a relay links. The diversity and flexibility of decision manners are improved, and improper decisions are avoided, so that a development requirement of a large-scale VVoIP technology can be met.

From the global aspect of the system, the stability of a virtual queue is maintained, so that the overall call quality of the system is close to a preset expected value, thereby improving the controllability of link switching. Moreover, links are decided and bandwidths are deployed according to the current virtual queue and load of the server, thereby achieving dynamic deployment and flexibility of the bandwidths and rational use of a system bandwidth. The problem of overload or a bandwidth waste of the system caused by the link switching is avoided, operating costs are reduced, and the problem of a decrease in call quality caused by high load of the system bandwidth is also avoided.

It may be clearly learned by a person skilled in the art that, for the purpose of convenient and brief description, for a specific working process of the system, apparatus, and unit described above, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely a logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware plus a software functional unit.

An integrated unit implemented in the form of a software functional unit may be stored in a computer-readable storage medium. The software functional unit is stored in a storage medium, and includes several instructions for instructing a computer apparatus (which may be a personal computer, a server, or a network apparatus) or a processor to perform some steps of the method in each embodiment of this application. The foregoing storage medium may include various media capable of storing program code, such as a USB flash drive, a removable hard disk, a read-only memory (ROM), a random access memory (RAM), a magnetic disk, or an optical disc.

What is claimed is:

1. A method comprising:
    obtaining, by a server, call information of a plurality of first users currently in network calls in a network call system;
    obtaining, by the server, direct link quality and relay link quality corresponding to each first user of the plurality of users according to the call information;
    selecting, by the server from a plurality of second users whose relay link quality is higher than the corresponding direct link quality among the plurality of first users, a plurality of third users according to the call information of the plurality of second users that causes a total link quality gain of the plurality of second users to have a maximum value not greater than an expected value; and
    adjusting a link used for a call of each of the plurality of third users to be a relay link, and adjusting a link used for a call of each of the plurality of second users except the plurality of third users to be a direct link.

2. The method according to claim 1, wherein the call information comprises the direct link quality and the relay link quality of the first users, a direct link is a call link not using a private line network of the network call system, a relay link is a call link using the private line network of the network call system as a relay, and call data of the user is transmitted by one of the direct link and the relay link;
    wherein the selecting comprises:
    determining the plurality of third users as users using relay links, and determining each of the plurality of second users except the plurality of third users as a user using a direct link, and
    wherein the total link quality gain of the plurality of second users is a sum of link quality gains obtained by the plurality of third users using relay links determined among the plurality of second users compared with using direct links.

3. The method according to claim 2, further comprising:
    calculating the expected value based on a preset expected value of a load average of the network call system and an expected value of a link quality gain obtained by using a relay link for a single call as compared with using a direct link.

4. The method according to claim 2, wherein
    the call information is obtained in a first time period among a plurality of preset time periods; and
    the link used for the call of each of the plurality of third users in a time period next to the first time period is adjusted to be a relay link, and the link used for the call of each of the plurality of second users except the plurality of third users in the time period next to the first time period is adjusted to be a direct link.

5. The method according to claim 4, wherein the selecting comprises:
    obtaining an accumulated gain in a second time period previous to the first time period, the accumulated gain in the second time period being the larger one of zero and a sum of an accumulated gain in a time period previous to the second time period and a gain difference in the second time period, the gain difference being a difference between a preset expected system gain value and a total link quality gain in the second time period, and the total link quality gain in the second time period being a sum of link quality gains obtained by a plurality of fourth users using relay links decided in the second time period compared with using direct links;

using a sum of the expected system gain value and the accumulated gain in the second time period as the expected value; and selecting, from the plurality of second users, the plurality of third users that causes the total link quality gain of the plurality of second users to have the maximum value not greater than the expected value.

6. The method according to claim 2, further comprising at least one of the following:

deciding, for at least one fifth user whose relay link quality is not higher than the corresponding direct link quality among the plurality of first users, that a call link of the at least one fifth user is a direct link;

deciding, for at least one sixth user whose relay link is interrupted among the plurality of first users, that a call link of the at least one sixth user is a direct link; or deciding, for at least one seventh user whose direct link is interrupted among the plurality of users, that a call link of the at least one seventh user is a relay link, wherein the plurality of second users is users among the plurality of first users except the at least one fifth user, the at least one sixth user, and the at least one seventh user.

7. The method according to claim 2, wherein the plurality of third users are selected according to a preset bandwidth, the plurality of third users causing the total link quality gain of the plurality of second users to be the maximum value not greater than the expected value, and a total bandwidth occupied by the plurality of third users being not greater than the preset bandwidth.

8. The method according to claim 7, wherein the plurality of third users are selected according to a preset bandwidth by:

determining, for each candidate bandwidth in a plurality of preset candidate bandwidths, a group of third users corresponding to the candidate bandwidth, the group of third users causing the total link quality gain of the plurality of second users to be the maximum value not greater than the expected value, and a total bandwidth occupied by the group of third users being not greater than the candidate bandwidth; and selecting, according to all the candidate bandwidths and a sum of link quality gains of all the groups of third users corresponding to all the candidate bandwidths, a group of third users as the plurality of third users decided to use relay links.

9. The method according to claim 8, wherein the call information is obtained in a first time period among a plurality of preset time periods; and the group of third users are selected as the plurality of third users by:

obtaining an accumulated gain in each third time period prior to the first time period, wherein the accumulated gain in the third time period is the larger one of zero and a sum of an accumulated gain in a time period previous to the third time period and a gain difference in the third time period, the gain difference is a difference between a preset expected system gain value and a total link quality gain in the third time period, and the total link quality gain in the third time period is a sum of link quality gains obtained by users using relay links decided in the third time period compared with using direct links;

calculating, for each candidate bandwidth in the plurality of preset candidate bandwidths, an accumulated gain corresponding to the candidate bandwidth, the accumulated gain being the larger one of zero and a sum of an accumulated gain in a time period previous to the first time period and a gain difference corresponding to the candidate bandwidth, the gain difference being a difference between the preset expected system gain value and a total link quality gain corresponding to the candidate bandwidth, and the total link quality gain corresponding to the candidate bandwidth being a sum of link quality gains obtained by a group of third users corresponding to the candidate bandwidth that use relay links decided compared with using direct links;

calculating, for each candidate bandwidth in the plurality of preset candidate bandwidths, a variation between a first array and a second array that correspond to the candidate bandwidth, wherein the first array comprises the accumulated gain corresponding to the candidate bandwidth and the accumulated gain in each third time period, and the second array comprises the accumulated gain in each third time period;

calculating, for each candidate bandwidth in the plurality of preset candidate bandwidths, a score of the candidate bandwidth by using the variation of the candidate bandwidth and cost of the candidate bandwidth; and selecting, from the plurality of candidate bandwidths, a group of third users corresponding to a candidate bandwidth having a score meeting a threshold condition as the plurality of third users decided to use relay links.

10. A server comprising:

at least one memory configured to store computer program code; and at least one processor configured to access the at least one memory and operate according to the computer program code, the computer program code including:

first obtaining code configured to cause at least one of the at least one processor to obtain call information of a plurality of first users currently in network calls in a network call system;

second obtaining code configured to cause at least one of the at least one processor to obtain direct link quality and relay link quality corresponding to each first user of the plurality of first users according to the call information;

first selecting code configured to cause at least one of the at least one processor to select, from a plurality of second users whose relay link quality is higher than the corresponding direct link quality among the plurality of first users, a plurality of third users according to the call information of the plurality of second users that causes a total link quality gain of the plurality of second users to have a maximum value not greater than an expected value; and adjusting code configured to cause at least one of the at least one processor to adjust a link used for a call of each of the plurality of third users to be a relay link, and adjust a link used for a call of each of the plurality of second users except the plurality of third users to be a direct link.

11. The server according to claim 10, wherein the call information comprises direct link quality and relay link quality of the first users, a direct link is a call link not using a private line network of the network call system, a relay link is a call link using the private line network of the network call system as a relay, and call data of the user is transmitted by one of the direct link and the relay link;

wherein the selecting code is further configured to cause at least one of the at least one processor to:

determine the plurality of third users as users using relay links, and determine each of the plurality of second users except the plurality of third users as a user using a direct link; and wherein the total link quality gain of the plurality of second users being a sum of link quality gains obtained by the plurality of third users who uses relay links determined among the plurality of second users compared with using direct links.

12. The server according to claim 11, wherein the computer program code further comprises:

calculating code configured to cause at least one of the at least one processor to calculate the expected value based on a preset expected value of a load average of the network call system and an expected value of a link quality gain obtained by using a relay link for a single call as compared with using a direct link.

13. The server according to claim 11, wherein the call information is obtained in a first time period among a plurality of preset time periods; and the link used for the call of each third user in the plurality of third users in a time period next to the first time period is adjusted to be a relay link, and the link used for the call of each of the plurality of second users except the plurality of third users in the time period next to the first time period is adjusted to be a direct link.

14. The server according to claim 13, wherein the selecting code further comprises:

third obtaining code configured to cause at least one of the at least one processor to obtain an accumulated gain in a second time period previous to the first time period, the accumulated gain in the second time period being the larger one of zero and a sum of an accumulated gain in a time period previous to the second time period and a gain difference in the second time period, the gain difference being a difference between a preset expected system gain value and a total gain in the second time period, and the total gain being a sum of link quality gains obtained by a plurality of fourth users decided to use relay links in the second time period, compared with using direct links;

using code configured to cause at least one of the at least one processor to use a sum of the expected system gain value and the accumulated gain in the second time period as the expected value; and selecting sub-code configured to cause at least one of the at least one processor to select, from the plurality of second users, the plurality of third users that causes the total link quality gain of the plurality of second users to have the maximum value not greater than the expected value.

15. The server according to claim 11, wherein the computer program code further comprises at least one of the following:

first deciding code configured to cause at least one of the at least one processor to decide, for at least one fifth user whose relay link quality is not higher than the corresponding direct link quality among the plurality of users, that a call link of the at least one fifth user is a direct link;

second deciding code configured to cause at least one of the at least one processor to decide, for at least one sixth user whose relay link is interrupted among the plurality of users, that a call link of the at least one sixth user is a direct link; or third deciding code configured to cause at least one of the at least one processor to decide, for at least one seventh user whose direct link is interrupted among the plurality of users, that a call link of the at least one seventh user is a relay link, wherein the plurality of first users is users among the plurality of first users except the at least one fifth user, the at least one sixth user, and the at least one seventh user.

16. The server according to claim 11, wherein the plurality of third users are selected according to a preset bandwidth, the plurality of third users causing the total link quality gain of the plurality of second users to be the maximum value not greater than the expected value, and a total bandwidth occupied by the plurality of third users being not greater than the preset bandwidth.

17. The server according to claim 16, wherein the computer program code further comprises:

determining code configured to cause at least one of the at least one processor to determine, for each candidate bandwidth in a plurality of preset candidate bandwidths, a group of third users corresponding to the candidate bandwidth, the group of third users causing the total link quality gain of the plurality of second users to be the maximum value not greater than the expected value, and a total bandwidth occupied by the group of third users being not greater than the candidate bandwidth; and second selecting code configured to cause at least one of the at least one processor to select, according to all the candidate bandwidths and a sum of link quality gains of all the groups of third users corresponding to all the candidate bandwidths, a group of third users as the plurality of third users decided to use relay links.

18. The server according to claim 17, wherein the call information is obtained in a first time period among a plurality of preset time periods; and the computer program code further comprises:

third obtaining code configured to cause at least one of the at least one processor to obtain an accumulated gain in each third time period prior to the first time period, wherein the accumulated gain in the third time period is the larger one of zero and a sum of an accumulated gain in a time period previous to the third time period and a gain difference in the third time period, the gain difference is a difference between a preset expected system gain value and a total link quality gain in the third time period, and the total link quality gain is a sum of link quality gains obtained by a plurality of users using relay links decided in the third time period compared with using direct links;

first calculating code configured to cause at least one of the at least one processor to calculate, for each candidate bandwidth in the plurality of preset candidate bandwidths, an accumulated gain corresponding to the candidate bandwidth, the accumulated gain being the larger one of zero and a sum of an accumulated gain in a time period previous to the first time period and a gain difference corresponding to the candidate bandwidth, the gain difference being a difference between the preset expected system gain value and a total gain corresponding to the candidate bandwidth, and the total gain being a sum of link quality gains obtained by a group of third users corresponding to the candidate bandwidth that use relay links decided compared with using direct links;

second calculating code configured to cause at least one of the at least one processor to calculate, for each candidate bandwidth in the plurality of preset candidate bandwidths, a variation between a first array and a second array that correspond to the candidate bandwidth, wherein the first array comprises the accumulated gain corresponding to the candidate bandwidth and the accumulated gain in each third time period, and the second array comprises the accumulated gain in each third time period;

third calculating code configured to cause at least one of the at least one processor to calculate, for each candidate bandwidth in the plurality of preset candidate bandwidths, a score of the candidate bandwidth by using the variation of the candidate bandwidth and cost of the candidate bandwidth; and third selecting code configured to cause at least one of the at least one processor to select, from the plurality of candidate bandwidths, a group of third users corresponding to a candidate bandwidth having a score meeting a threshold condition as the plurality of third users decided to use relay links.

19. A non-transitory computer readable storage medium, storing computer readable code which, when executed by a processor, causes the processor to:

obtain call information of a plurality of first users currently in network calls in a network call system;

obtain direct link quality and relay link quality corresponding to each first user of the plurality of first users according to the call information;

selecting, from a plurality of second users whose relay link quality is higher than the corresponding direct link quality among the plurality of first users, a plurality of third users according to the call information of the plurality of second users that causes a total link quality gain of the plurality of second users to have a maximum value not greater than an expected value; and adjusting a link used for a call of each of the plurality of third users to be a relay link, and adjusting a link used for a call of each of the plurality of second users except the plurality of third users to be a direct link.

20. The computer readable medium according to claim 19, wherein the call information comprises the direct link quality and the relay link quality of the first users, a direct link is a call link not using a private line network of the network call system, a relay link is a call link using the private line network of the network call system as a relay, and call data of the user is transmitted by one of the direct link and the relay link;

wherein the selecting comprises:

determining the plurality of third users as users using relay links, and determining each of the plurality of second users except the plurality of third users as a user using a direct link; and wherein the total link quality gain of the plurality of second users is a sum of link quality gains obtained by the plurality of third users using relay links determined among the plurality of second users compared with using direct links.

* * * * *